(12) United States Patent
Watanabe et al.

(10) Patent No.: US 10,017,177 B2
(45) Date of Patent: Jul. 10, 2018

(54) TORQUE CONTROL APPARATUS

(71) Applicant: Bosch Corporation, Tokyo (JP)

(72) Inventors: Takuya Watanabe, Kanagawa (JP); Yoshihide Igari, Kanagawa (JP)

(73) Assignee: Bosch Corporation, Tokyo (JP)

( * ) Notice: Subject to any disclaimer, the term of this patent is extended or adjusted under 35 U.S.C. 154(b) by 297 days.

(21) Appl. No.: 14/783,902

(22) PCT Filed: Mar. 21, 2014

(86) PCT No.: PCT/JP2014/057924
§ 371 (c)(1),
(2) Date: Nov. 18, 2015

(87) PCT Pub. No.: WO2014/167983
PCT Pub. Date: Oct. 16, 2014

(65) Prior Publication Data
US 2016/0144854 A1 May 26, 2016

(30) Foreign Application Priority Data

Apr. 10, 2013 (JP) .................................. 2013-081985

(51) Int. Cl.
*B60W 30/02* (2012.01)
*B60W 10/06* (2006.01)
(Continued)

(52) U.S. Cl.
CPC ............. *B60W 30/02* (2013.01); *B60T 8/175* (2013.01); *B60T 8/1706* (2013.01);
(Continued)

(58) Field of Classification Search
None
See application file for complete search history.

(56) References Cited

U.S. PATENT DOCUMENTS 6,701,893 B2 * 3/2004 Isoda .................. B60L 3/10
123/406.25
2004/0256170 A1 * 12/2004 Gaudiano ............. B60K 28/14
180/282
(Continued)

FOREIGN PATENT DOCUMENTS

DE 19532521 * 3/1997
EP 001184272 A2 * 3/2002
(Continued)

OTHER PUBLICATIONS

International Search Report for Application No. PCT/JP2014/057924 dated Jun. 17, 2014 (English Translation, 1 page).

*Primary Examiner* — Colby M Hansen
(74) *Attorney, Agent, or Firm* — Michael Best & Friedrich LLP

(57) ABSTRACT

To suppress occurrence of a wheelie of a motorcycle.
A torque control apparatus includes a the detection unit that detects a state in which the front wheel of the motorcycle is likely to be lifted up based on at least one of engine information of the motorcycle, accelerator operation information of the driver of the motorcycle, and information of the vehicle body or wheel of the motorcycle. The torque control apparatus further includes an output unit that, when the detection unit detects the state in which the front wheel is likely to be lifted up, outputs a torque smaller than a request torque of the driver as a request torque for an the engine of the motorcycle or outputs the difference between the request torque of the driver and a torque smaller than the request torque of the driver as a brake torque.

11 Claims, 6 Drawing Sheets

(51) Int. Cl.
*B60W 30/18* (2012.01)
*B60T 8/1755* (2006.01)
*B60W 10/184* (2012.01)
*B62J 27/00* (2006.01)
*B62J 99/00* (2009.01)
*B60T 8/17* (2006.01)
*F02D 41/10* (2006.01)
*B60T 8/175* (2006.01)

(52) U.S. Cl.
CPC ........... *B60T 8/1755* (2013.01); *B60W 10/06* (2013.01); *B60W 10/184* (2013.01); *B60W 30/18* (2013.01); *B62J 27/00* (2013.01); *B62J 99/00* (2013.01); *F02D 41/10* (2013.01); *B60T 2230/03* (2013.01); *B60T 2240/06* (2013.01); *B60W 2510/0638* (2013.01); *B60W 2510/0657* (2013.01); *B60W 2510/0661* (2013.01); *B60W 2510/1005* (2013.01); *B60W 2520/105* (2013.01); *B60W 2520/16* (2013.01); *B60W 2520/28* (2013.01); *B60W 2540/10* (2013.01); *B60W 2710/0666* (2013.01); *B62J 2300/002* (2013.01); *B62K 2202/00* (2013.01); *F02D 2200/50* (2013.01); *F02D 2200/602* (2013.01); *F02D 2250/26* (2013.01)

(56) References Cited

U.S. PATENT DOCUMENTS

| | | | |
|---|---|---|---|
| 2011/0160973 A1* | 6/2011 | Matsuda | B60T 8/1706 701/70 |
| 2011/0160976 A1* | 6/2011 | Matsuda | B60T 8/1706 701/70 |
| 2013/0261925 A1* | 10/2013 | Kobayashi | B60K 28/16 701/85 |

FOREIGN PATENT DOCUMENTS

| | | | |
|---|---|---|---|
| JP | 2002070709 | | 3/2002 |
| JP | 2007-245993 | * | 9/2007 |
| JP | 2011068253 | | 4/2011 |
| JP | 2012145072 | | 8/2012 |

* cited by examiner

TORQUE CONTROL APPARATUS

BACKGROUND OF THE INVENTION

The present invention relates to a torque control apparatus.

Conventionally, a traction control system (TCS) is known in control of a vehicle such as an automobile or a motorcycle. A TCS performs control by detecting the spin-up (idle running) of the drive wheel of the vehicle and calculating the engine power (torque) for suppressing the spin-up, so that a driving wheel can efficiently transfer a force to a road surface.

Although there are many types of control methods using a TCS, slip control is known as a typical method. This slip control is a control method that determines the desired speed (target speed) of a drive wheel, reduces the engine power (torque) if the actual speed of the drive wheel is larger than the target speed, and increases the engine power (torque) if the actual speed of the drive wheel is smaller than the target speed. More specifically, PID (Proportional Integral Derivative) control is performed on the deviation between the target speed and the actual speed of the drive wheel.

As for this TCS, JP-A-2002-70709 discloses a technique for determining a state (wheelie state) in which the front wheel of a motorcycle is lifted up based on the detection output of an acceleration sensor provided in a motorcycle and, when the wheelie state is detected, reduces the engine power gradually. It is said that this technique can return the state of the front wheel from the wheelie state to the original state slowly.

SUMMARY OF THE INVENTION

However, since the related art reduces the engine power after the motorcycle is determined to be in a wheelie state, the vehicle body may become unstable when the motorcycle is in a wheelie state.

In addition, since the conventional TCS reduces the engine power after detecting the spin-up of the drive wheel, a wheelie state may occur before reducing the engine power.

Accordingly, an object of the invention of the present application is to achieve a torque control apparatus capable of suppressing the occurrence of a wheelie of a motorcycle.

The present invention addresses the above problems with the object of providing a torque control apparatus including a detection unit detecting a state in which a front wheel of a motorcycle is likely to be lifted up based on at least one of engine information of the motorcycle, accelerator operation information of a driver of the motorcycle, and body or wheel information of the motorcycle and an output unit outputting a torque smaller than a request torque of the driver as a request torque for an engine of the motorcycle or outputting a difference between the request torque of the driver and the torque smaller than the request torque of the driver as a brake torque when the detection unit has detected the state in which the front wheel of the motorcycle is likely to be lifted up.

When the engine information of the motorcycle includes an actual engine torque of the motorcycle, the request torque of the driver, or an engine speed of the motorcycle, the detection unit may detect the state in which the front wheel of the motorcycle is likely to be lifted up when a change ratio or a change amount of the actual engine torque of the motorcycle becomes larger than a preset threshold, a change ratio or a change amount of the request torque of the driver becomes larger than a preset threshold, or a change ratio or a change amount of the engine speed of the motorcycle becomes larger than a preset threshold.

When the accelerator operation information includes an accelerator pedal position of the motorcycle, the detection unit may detect the state in which the front wheel of the motorcycle is likely to be lifted up when a change ratio or a change amount of the accelerator pedal position of the motorcycle becomes larger than a preset threshold.

The detection unit may detect that an actual acceleration or an estimated acceleration of a vehicle body or a wheel of the motorcycle becomes larger than a preset threshold and the output unit may further reduce or keep the request torque for the engine of the motorcycle and output the torque after the detection unit detects the state in which the front wheel of the motorcycle is likely to be lifted up and then detects that the actual acceleration or the estimated acceleration of the vehicle body or the wheel of the motorcycle becomes larger than the preset threshold.

The output unit may correct either or both of the request torque for the engine of the motorcycle and the brake torque based on bank information, pitch information, clutch information, estimated gear position information, or gear information of the motorcycle.

When the engine information of the motorcycle includes the actual engine torque of the motorcycle and the change ratio or the change amount of the actual engine torque, the detection unit may detect the state in which the front wheel of the motorcycle is likely to be lifted up when the change ratio or the change amount of the actual engine torque becomes larger than a threshold of the change ratio or the change amount of the actual engine torque preset according to a magnitude of the actual engine torque or the actual engine torque becomes larger than a threshold of the actual engine torque preset according to a magnitude of the change ratio or the change amount of the actual engine torque.

The threshold of the change ratio or the change amount of the actual engine torque or the threshold of the actual engine torque may be corrected based on the bank information, the pitch information, engine speed information, the accelerator operation information, the clutch information, the estimated gear position information, or the gear information of the motorcycle.

When the engine information of the motorcycle includes the actual engine torque of the motorcycle or the request torque for the motorcycle, the detection unit may detect the state in which the front wheel of the motorcycle is likely to be lifted up if at least one of conditions that the actual acceleration or the estimated acceleration of the vehicle body or the wheel of the motorcycle becomes larger than the preset threshold, that the actual engine torque becomes larger than the preset threshold, that the driver request torque for the motorcycle becomes larger than the preset threshold, that the accelerator pedal position becomes larger than the preset threshold, and that the engine speed becomes larger than the preset threshold is met.

When a ratio between rotation speeds of a front wheel and a rear wheel of the motorcycle becomes larger than a preset threshold, the output unit may output a torque smaller than the request torque of the driver as the request torque for the engine of the motorcycle.

The invention of the application achieves a torque control apparatus capable of suppressing occurrence of a wheelie of a motorcycle.

DETAILED DESCRIPTION

A torque control apparatus according to an embodiment of the preset invention will be described below with reference to the drawings. Although ABS (Antilock Brake System)/MTC (Motorcycle Traction Control) ECU (Electrical Control Unit) is used as an example of the torque control apparatus in the following embodiment, the invention is not limited to this embodiment.

Figure 1:
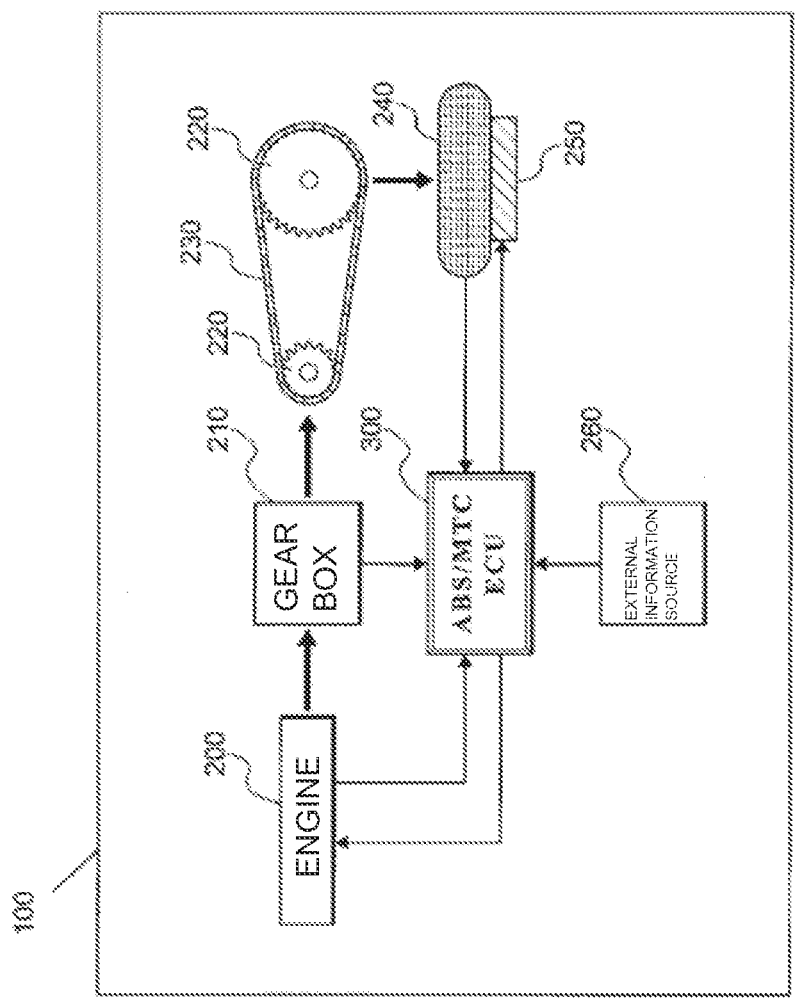
FIG. 1 shows the structure of a torque control system including a torque control apparatus according to the present embodiment.

FIG. 1 shows the structure of a torque control system including a torque control apparatus according to the embodiment. As shown in FIG. 1, a torque control system 100 includes an engine 200 of the vehicle body of a motorcycle, a gear box 210 for transferring a driving force from the engine 200, a sprocket 220, and a chain 230, a wheel 240 rotated and driven by the transferred driving force, a brake 250 for braking the driving force for the wheel 240. The wheel 240 includes a wheel speed sensor.

The torque control system 100 also includes an external information source 260 incorporating a sensor box accommodating sensors such as an acceleration sensor detecting accelerations in the X-, Y-, and Z-directions and a yaw rate sensor detecting the yaw rate of a vehicle body. The external information source 260 may also receive a signal from a GPS (Global Positioning System) satellite or receive information such as expansion and contraction of forks from various types of sensors to obtain the acceleration of a motorcycle.

The torque control system 100 also includes to a control apparatus (ABS/MTC ECU) 300 that outputs a request torque to the engine 200. The torque control apparatus 300 also controls the braking force of the brake 250.

The torque control apparatus 300 receives the engine speed of the engine 200, an actual engine torque (Nm), a driver request torque (Nm), an accelerator pedal position (%), and so on from the engine 200. The torque control apparatus 300 also receives the gear information of the motorcycle from the gear box 210. The torque control apparatus 300 also receives the information of the wheel 240 from the wheel speed sensor installed in the wheel 240. Based on the information obtained from the wheel speed sensor, the wheel speed, wheel acceleration, and so on are calculated. The torque control apparatus 300 also receives the acceleration and yaw rate of the vehicle body from the external information source 260.

The torque control apparatus 300 outputs a request torque to the engine 200 based on the input various types of information. Specifically, the torque control apparatus 300 according to the embodiment includes a detection unit 310 detecting a state in which the front wheel of the motorcycle is likely to be lifted up (put in a wheelie state). The torque control apparatus 300 also includes an output unit 320 that outputs a torque smaller than a request torque (driver request torque) of the driver as a request torque for the engine 200 or outputs the difference between the request torque of the driver and the torque smaller than the request torque of the driver as a brake torque when the detection unit 310 detects a state in which the front wheel is likely to be lifted up. The torque control apparatus 300 will be described in detail below.

First Example

Figure 2:
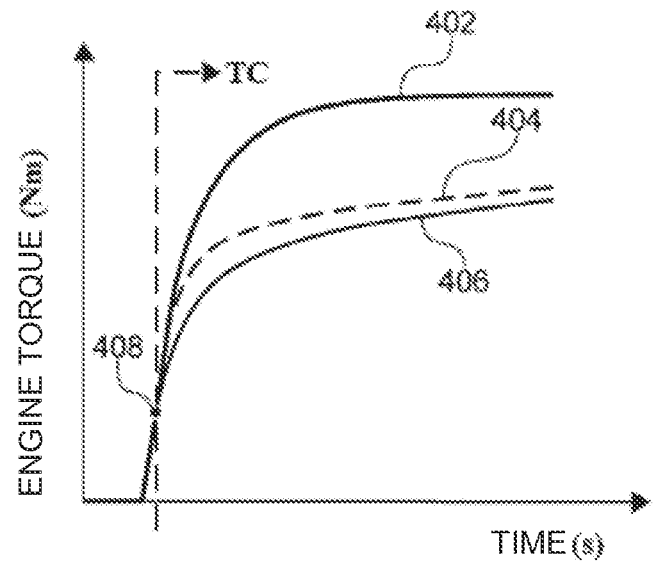
FIG. 2 shows a first example of control by the torque control apparatus according to the embodiment.

FIG. 2 shows a first example of control by the torque control apparatus according to the embodiment. In FIG. 2, the vertical axis represents the engine torque (Nm) and the horizontal axis represents an elapse of time (s).

It is assumed that a driver request torque 402 requested by the driver changes as shown in FIG. 2. For example, when the accelerator pedal position is greatly shifted suddenly from the stop state, the driver request torque 402 sharply rises as shown in FIG. 2.

The detection unit 310 obtains the change ratio or change amount of the driver request torque 402 by performing the time differentiation of the driver request torque 402. When the obtained change ratio or change amount of the driver request torque 402 becomes larger than a preset threshold, the detection unit 310 detects a state in which the front wheel of the motorcycle is likely to be lifted up. That is, the fact that the change ratio or change amount of the driver request torque 402 is larger than the threshold indicates the driver's sudden opening of the accelerator pedal and this indicates the possibility of occurrence of a wheelie. In FIG. 2, it is assumed that a state in which the front wheel of the motorcycle is likely to be lifted up is detected at point 408.

Upon detection of a state in which the front wheel of the motorcycle is likely to be lifted, the output unit 320 outputs a torque smaller than the driver request torque 402 to the engine 200 as a request torque 406. In other words, the torque control apparatus 300 outputs a torque with an incremental gradient smaller than that of the driver request torque 402 to the engine 200 as the request torque 406. The output unit 320 may also output the difference between the driver request torque 402 (the request torque of the driver) and the torque (the request torque 406) smaller than the request torque of the driver to the brake 250 as a brake torque.

In the first example, the actual engine torque of the engine 200 follows the driver request torque 402 until before reaching a control start point 408. Since the actual engine torque of the engine 200 follows the request torque 406 after passing the control start point 408, the actual engine torque can be reduced to a value smaller than the actual engine torque corresponding to the driver request torque 402. That is, control (gradient restriction) is performed so that the gradient is reduced to a value smaller than in the driver request torque 402 after passing the control start point 408. As a result, it is possible to suppress the occurrence of a wheelie state and prevent the vehicle body from becoming unstable. If a slip (spin-up) is determined by calculation during gradient restriction, a shift to slip control is performed.

In the TCS, slip control is known. The slip control determines the desired speed (target speed) of a drive wheel and, if the actual speed of the drive wheel is larger than the target speed, reduces the engine power (torque). The TCS request torque 406 indicated by the dashed line in FIG. 2 is a TCS request torque to be output to the engine 200 by the gradient restriction control.

Second Example

Figure 3:
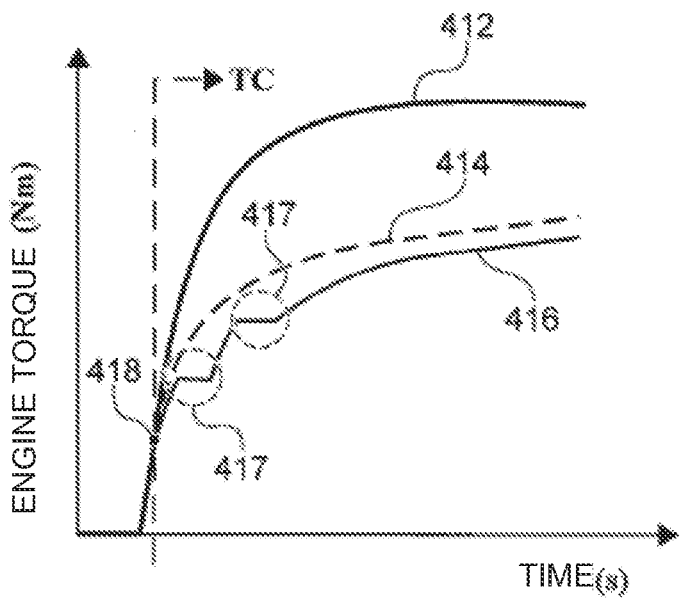
FIG. 3 shows a second example of control by the torque control apparatus according to the embodiment.

Next, a second example of control by the torque control apparatus according to the embodiment will be described. FIG. 3 shows the second example of control by the torque control apparatus according to the embodiment. In FIG. 3, the vertical axis represents the engine torque (Nm) and the horizontal axis represents an elapse of time (s).

It is assumed that a driver request torque 412 requested by the driver changes as shown in FIG. 3. For example, when the accelerator pedal position is greatly shifted suddenly from the stop state, the driver request torque 412 sharply rises as shown in FIG. 3. The driver request torque 412 in FIG. 3 corresponds to the driver request torque 402 in FIG. 2. In FIG. 3, it is assumed that a state in which the front wheel of the motorcycle is likely to be lifted up is detected at point 418, as in the first example.

In the second example, the detection unit 310 determines whether the acceleration of the vehicle body or the wheel 240 of the motorcycle becomes larger than a preset threshold. Although the acceleration of the vehicle body may be obtained by calculation based on the information of the wheel 240 and the vehicle body acceleration may be obtained based on the information of the front rear wheels, the acceleration sent by the external information source 260 may also be used for obtainment.

In addition, after the detection unit 310 detects a state in which the front wheel of the motorcycle is likely to be lifted up in an aspect as in the first example and then detects that the acceleration of the vehicle body or wheel of the motorcycle has become larger than a preset threshold, the output unit 320 further reduces and outputs the request torque for the engine of the motorcycle.

That is, a request torque 414 in FIG. 3 corresponds to the request torque 406 in FIG. 2. The output unit 320 outputs a request torque 416 smaller than the request torque 414 by providing the area in which the increase amount of the request torque is "0 (keep)" or "a small increase" as indicated by a dashed line 417.

In the second example, in addition to the first example, when the acceleration of the vehicle body or the wheel 240 of the motorcycle is larger than a preset threshold and the possibility of occurrence of a wheelie state is higher, a smaller request torque 416 is output. As a result, the actual engine torque can be suppressed to a smaller value, reliably preventing occurrence of a wheelie state. When the accelerator pedal position becomes larger than a preset threshold, the detection unit 310 may detect a state in which the front wheel of the motorcycle is likely to be lifted up.

Third Example

Figure 4:
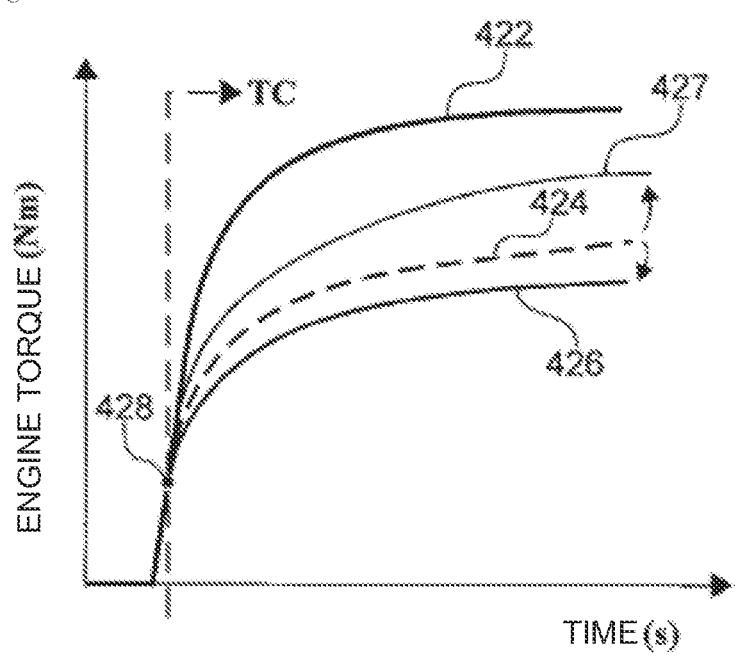
FIG. 4 shows a third example of control by the torque control apparatus according to the embodiment.

Next, a third example of control by the torque control apparatus according to the embodiment will be described. FIG. 4 shows the third example of control by the torque control apparatus according to the embodiment. In FIG. 4, the vertical axis represents the engine torque (Nm) and the horizontal axis represents an elapse of time (s).

It is assumed that a driver request torque 422 requested by the driver changes as shown in FIG. 4. For example, when the accelerator pedal position is greatly shifted suddenly from the stop state, the driver request torque 422 sharply rises as shown in FIG. 4. The driver request torque 422 in FIG. 4 corresponds to the driver request torque 402 in FIG. 2. In FIG. 4, it is assumed that a state in which the front wheel of the motorcycle is likely to be lifted up is detected at point 428, as in the first example.

In the third example, the output unit 320 restricts (corrects the timing) or prohibits a control start point 428 or corrects a request torque for the engine of the motorcycle based on the bank information (for example, the bank angle), the pitch information (for example, the pitch angle), the clutch information, the estimated gear position information, or the gear information of the motorcycle. That is, the request 424 torque in FIG. 4 corresponds to the request torque 406 in FIG. 2. The output unit 320 may correct the request torque to a larger value like a request torque 427 according to, for example, the bank information (for example, the bank angle) of the motorcycle. For example, a wheelie state is less apt to occur when the bank angle of the motorcycle becomes larger. Accordingly, the request torque can be increased by that amount to approach the driver request torque 422, thereby enabling the obtainment of acceleration performance close to the driver request. If connection to the clutch is not made due to clutch information, unnecessary TCS control can be suppressed by suppressing or prohibiting an increase in the request torque. In addition, the gear position may be estimated by the ratio of the engine speed.

On the other hand, the output unit 320 may correct the request torque to a smaller value like a request torque 426 according to the bank angle of the motorcycle. When the bank angle of the motorcycle becomes smaller, a wheelie state is more apt to occur and a vehicle that poorly grips the ground slips. Accordingly, by reducing the request torque by that amount, the occurrence of a wheelie state can be suppressed and the stability of the vehicle body can be ensured.

In addition, since a wheelie state is more apt to occur as, for example, the pitch angle becomes larger, the output unit 320 may correct the request torque to a smaller value like a request torque 426. In contrast, since a wheelie state is less apt to occur as the pitch angle becomes smaller, the output unit 320 may correct the request torque to a larger value like the request torque 427.

In addition, since a wheelie state is more apt to occur as the gear of the motorcycle shifts to a lower speed gear, the output unit 320 may correct the request torque to a smaller value like a request torque 426. In contrast, since a wheelie state is less apt to occur as the gear of the motorcycle shifts to a higher speed gear, the output unit 320 may correct the request torque to a larger value like the request torque 427 or restrict or prohibit the control at the time of the start point 428.

In the third example, according to the state of the motorcycle (bank angle, pitch angle, clutch information, estimated gear position information, or gear state), the control start point 428 may be corrected or prohibited or the request torque for the engine 200 may be corrected appropriately.

Figure 5:
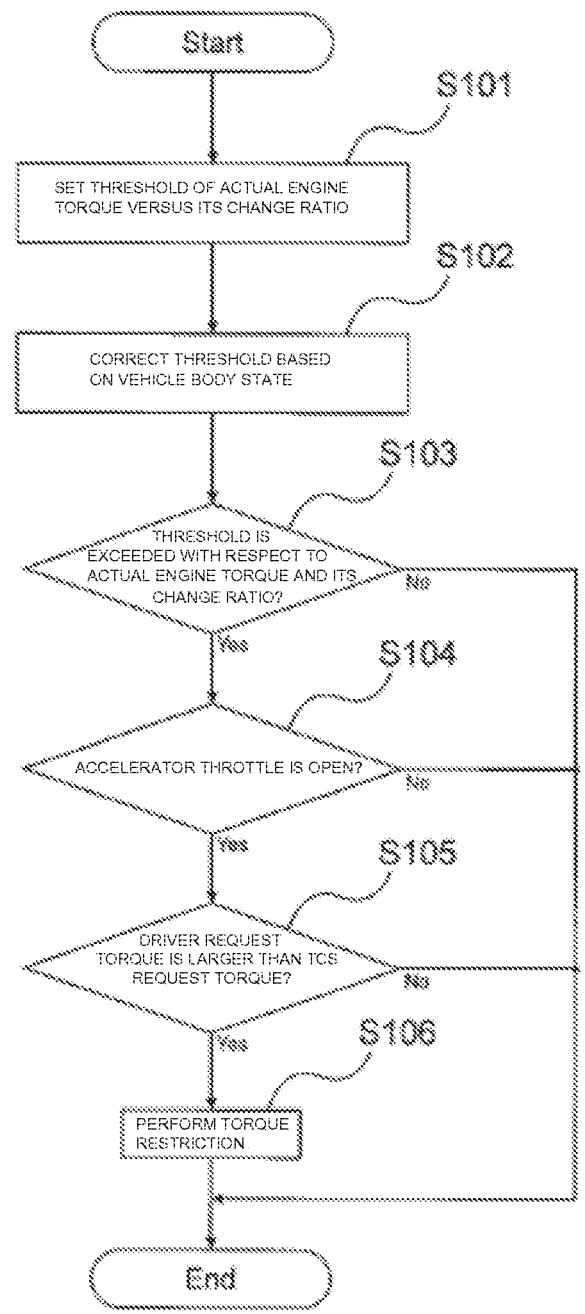
FIG. 5 shows a processing flow by the torque control apparatus according to the embodiment.
Figure 6:
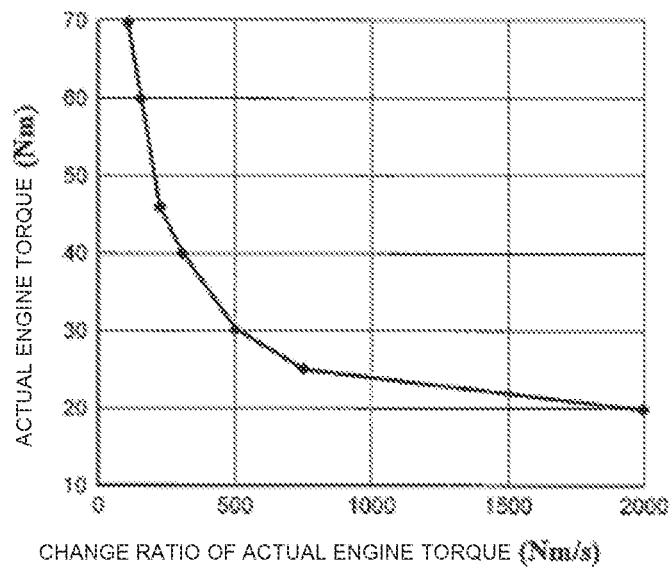
FIG. 6 shows an example of the threshold of the actual engine torque versus the change ratio of the actual engine torque.

Next, a processing flow of the torque control apparatus according to the embodiment will be described. FIG. 5 shows the processing flow by the torque control apparatus according to the embodiment. FIG. 6 shows an example of threshold of the actual engine torque versus the change ratio of the actual engine torque. Although the change ratio of an actual engine torque is used in the following description, the invention is not limited to this example and the change amount of an actual engine torque may also be used.

The processing flow in FIG. 5 describes, as one example, a case in which the threshold of the change ratio of the actual engine torque is set in advance according to the magnitude of the actual engine torque of the motorcycle.

First, as shown in FIG. 5, the detection unit 310 sets the threshold of the actual engine torque versus its change ratio of the motorcycle (step S101).

Here, the threshold of the actual engine torque versus its change ratio of the motorcycle is set as shown in FIG. 6. That is, in FIG. 6, the vertical axis represents the actual engine torque (Nm) and the horizontal axis represents the change ratio (Nm/s) of the actual engine torque. For example, in this example, the threshold of the change ratio (Nm/s) of the actual engine torque is set according to the magnitude of the actual engine torque (Nm) of the motorcycle. In other words, the threshold of the actual engine torque (Nm) is set according to the magnitude of the change ratio (Nm/s) of the actual engine torque.

For example, when the actual engine torque is 30 (Nm), the threshold of the change ratio of the actual engine torque is set to 500 (Nm/s). In other words, when the change ratio of the actual engine torque is 500 (Nm/s), the threshold of the actual engine torque is set to 30 (Nm).

The detection unit 310 detects a state in which the front wheel of the motorcycle is likely to be lifted up when the change ratio of the actual engine torque becomes larger than the threshold of the change ratio of the actual engine torque preset according to the magnitude of the actual engine torque or the actual engine torque becomes larger than the threshold of the actual engine torque preset according to the magnitude of the change ratio of the actual engine torque.

For example, when the actual engine torque is 30 (Nm), the detection unit 310 determines that a wheelie state is like to occur if the change ratio of the actual engine torque is larger than 500 (Nm/s). For example, when the change ratio of the actual engine torque is 500 (Nm/s), the detection unit 310 determines that a wheelie state is likely to occur if the actual engine torque is larger than 30 (Nm).

Turning back to the description of FIG. 5, the detection unit 310 corrects the threshold based on the vehicle body state (bank angle, pitch angle, clutch information, estimated gear position information, or gear information) of the motorcycle (step S102). For example, since a wheelie state is less apt to occur as the bank angle becomes larger, the detection unit 310 sets the threshold to a larger value for a vehicle that well grips the ground (the possibility of occurrence of a wheelie state is less apt to be detected). In contrast, since a wheelie state is more apt to occur as the bank angle becomes smaller, the detection unit 310 may set the threshold to a smaller value for a vehicle that poorly grips the ground (the possibility of occurrence of a wheelie state or poor stability of the vehicle body is more apt to be detected).

In addition, since a wheelie state is less apt to occur as the pitch angle becomes smaller, the detection unit 310 may set the threshold to a larger value. In contrast, since a wheelie state is more apt to occur as the pitch angle becomes larger, the detection unit 310 may set the threshold to a smaller value. In addition, since a wheelie state is less apt to occur as the gear shifts to a higher speed gear, the detection unit 310 may set the threshold to a larger value. In contrast, since a wheelie state is more apt to occur as the gear shifts to a lower speed gear, the detection unit 310 may set the threshold to a smaller value.

Next, the detection unit 310 determines whether the threshold is exceeded with respect to the actual engine torque and its change ratio (step S103). If the detection unit 310 determines that the threshold is exceeded with respect to the actual engine torque and its change ratio (Yes in step S103), the detection unit 310 determines whether the accelerator throttle is open (step S104).

If the detection unit 310 determines that the accelerator throttle is open (Yes in step S104), the detection unit 310 determines whether the driver request torque is larger than the TCS request torque (step S105).

If it is determined that the driver request torque is larger than the TCS request torque (Yes in step S105), the output unit 320 performs torque restriction (step S106). That is, the output unit 320 outputs a torque smaller than the driver request torque (TCS request torque) to the engine 200 as a request torque.

In contrast, if it is determined that the threshold is not exceeded with respect to the actual engine torque and its change ratio (No in step S103), the accelerator throttle is not open (No in step S104), or the driver request torque is not larger than the TCS request torque (No in step S105), then the output unit 320 does not perform torque restriction.

As described above, in the processing flow of the torque control apparatus according to the embodiment, since the threshold is corrected based on the vehicle body state (bank angle, pitch angle, engine speed information, accelerator operation information, clutch information, estimated gear position information, or gear information) of the motorcycle, the threshold can be set appropriately. Also in the processing flow of the torque control apparatus according to the embodiment, since a decision is made as to whether a wheelie state is likely to occur based on the actual engine torque and its change ratio, the possibility of a wheelie state can be detected more reliably.

Fourth Example

Figure 7:
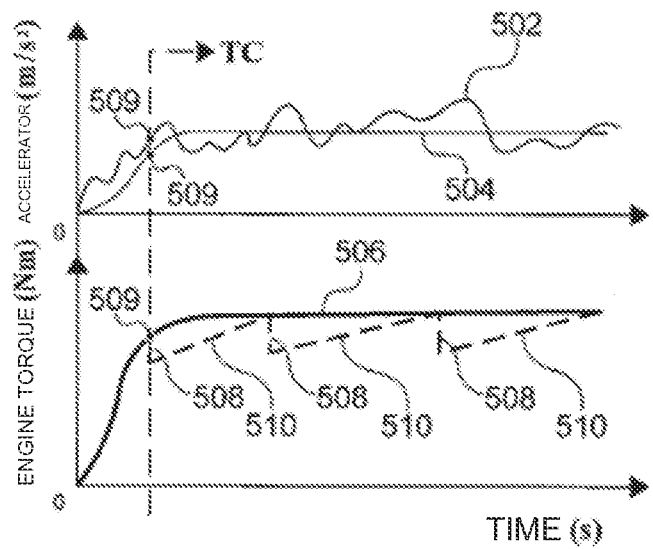
FIG. 7 shows a fourth example of control by the torque control apparatus according to the embodiment.

Next, a fourth example of control by the torque control apparatus according to the embodiment will be described. FIG. 7 shows the fourth example of control by the torque control apparatus according to the embodiment. In the upper drawing in FIG. 7, the vertical axis represents the acceleration (m/s$^2$) and the horizontal axis represents an elapse of time (s). In the lower drawing in FIG. 7, the vertical axis represents the actual engine torque (Nm) and the horizontal axis represents an elapse of time (s). Although the actual engine torque of the vehicle body or wheel of the motorcycle is used as an example in the following description, the invention is not limited to this and the estimated acceleration of the vehicle body or wheel of the motorcycle may also be used.

It is assumed that a rear wheel acceleration 502 and a vehicle body (estimated) acceleration 504 change as shown in the upper drawing in FIG. 7 and an actual engine torque 506 changes as shown in the lower drawing in FIG. 7. For example, when the accelerator pedal position is greatly shifted, the rear wheel acceleration 502, the vehicle body (estimated) acceleration 504, and the actual engine torque 506 are increased to higher values as shown in the upper drawing in FIG. 7.

In the fourth example, when the acceleration of the vehicle body or wheel of the motorcycle becomes larger than the preset threshold and the actual engine torque becomes larger than the preset threshold, the detection unit 310 detects a state in which the front wheel of the motorcycle is likely to be lifted up. That is, the fact that the rear wheel acceleration 502 or the vehicle body (estimated) acceleration 504 is larger than the threshold and the actual engine torque 506 is larger than the threshold indicates the possibility of a wheelie. In FIG. 7, it is assumed that a state in which the front wheel of the motorcycle is likely to be lifted up is detected at a point 509. The point 509 can be corrected based on the vehicle body state (bank angle, pitch angle, clutch information, estimated gear position information, or gear information) of the motorcycle.

If a state in which the front wheel of the motorcycle is likely to be lifted up is detected, the output unit 320 outputs a torque smaller than the actual engine torque 506 to the engine 200 as request torques 508 and 510. Specifically, the output unit 320 performs a torque cut using the request torque 508 and then increases the torque gradually using the request torque 510. The output unit 320 alternately outputs the request torque 508 and the request torque 510 repeatedly.

In the fourth example, since the actual engine torque of the engine 200 changes according to the request torques 508 and 510, the actual engine torque 506 can be suppressed to a small value. As a result, occurrence of a wheelie state can be prevented.

Fifth Example

Figure 8:
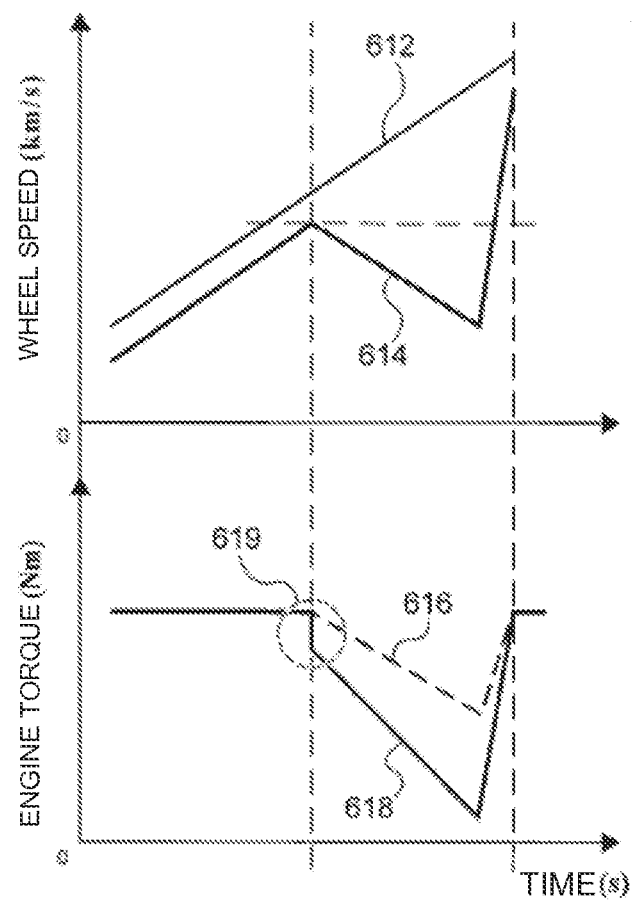
FIG. 8 shows a fifth example of control by the torque control apparatus according to the embodiment.

Next, a fifth example of control by the torque control apparatus according to the embodiment will be described. FIG. 8 shows the fifth example of control by the torque control apparatus according to the embodiment. In the upper drawing in FIG. 8, the vertical axis represents the wheel speed (m/s) and the horizontal axis represents an elapse of time (s). In the lower drawing in FIG. 8, the vertical axis represents the engine torque (Nm) and the horizontal axis represents an elapse of time (s).

The fifth example is an example in which a torque smaller than the request torque of the driver is output as the request torque for the engine of the motorcycle to get out of a wheelie state when the wheelie occurs in the motorcycle.

FIG. 8 shows the typical front wheel speed and rear wheel speed during occurrence of a wheelie of the motorcycle. When a wheelie occurs, as shown the above drawing in FIG. 8, a rear wheel speed 612 increases linearly and a front wheel speed 614 reduces. When the rate between the rear wheel speed 612 and the front wheel speed 614 becomes larger than a preset threshold, the detection unit 310 detects occurrence of a wheelie state. In FIG. 8, it is assumed that a wheelie state has occurred at a point 608.

When occurrence of a wheelie state is detected, the output unit 320 outputs a torque smaller than the request torque of the driver as a request torque 618. Specifically, the output unit 320 may first perform a torque cut as indicated by the dashed line 619 and then reduces the request torque 618.

In the TCS, slip control is known. The slip control determines the desired speed (target speed) of a drive wheel and, if the actual speed of the drive wheel is larger than the target speed, reduces the engine power (torque). A TCS request torque 616 indicated by the dashed line in the lower drawing in FIG. 8 is a TCS request torque to be output to the engine 200 by this slip control.

As shown in the lower drawing in FIG. 8, the torque control apparatus 300 according to the embodiment outputs, to the engine 200 as the request torque 618, a torque smaller than the TCS request torque 616 to be output to the engine 200 by the slip control. As a result, it is possible to return to the normal state (the state in which the front wheel makes contact with the ground) by getting out of a wheelie state when a wheelie state occurs.

The invention claimed is:

1. A torque control apparatus comprising:
    a detection unit configured to detect a state in which a front wheel of a motorcycle is likely to be lifted up based on at least one of engine information of the motorcycle, accelerator operation information of a driver of the motorcycle, and body or wheel information of the motorcycle; and
    an output unit outputting a torque smaller than a request torque of the driver as a request torque for an engine of the motorcycle or outputting a difference between the request torque of the driver and the torque smaller than the request torque of the driver as a brake torque when the detection unit has detected the state in which the front wheel of the motorcycle is likely to be lifted up;
    wherein the detection unit detects that an actual acceleration or an estimated acceleration of a vehicle body or a wheel of the motorcycle become larger than a preset threshold; and
    the output unit further reduces or keeps the request torque for the engine of the motorcycle and outputs the torque after the detection unit detects the state in which the front wheel of the motorcycle is likely to be lifted up and then detects that the actual acceleration or the estimated acceleration of the vehicle body or the wheel of the motorcycle become larger than the preset threshold.

2. The torque control apparatus according to claim 1,
    wherein the engine information of the motorcycle includes an actual engine torque of the motorcycle, the request torque of the driver, or an engine speed of the motorcycle and
    the detection unit detects the state in which the front wheel of the motorcycle is likely to be lifted up when a change rate or a change amount of the actual engine torque of the motorcycle becomes larger than a preset threshold, a change rate or a change amount of the request torque of the driver becomes larger than a preset threshold, or a change rate or a change amount of the engine speed of the motorcycle becomes larger than a preset threshold.

3. The torque control apparatus according to claim 2,
    wherein the detection unit detects that an estimated acceleration of a vehicle body of the motorcycle becomes larger than a preset threshold and
    the output unit further reduces or keeps the request torque for the engine of the motorcycle and outputs the torque after the detection unit detects the state in which the front wheel of the motorcycle is likely to be lifted up and then detects that the estimated acceleration ion of the vehicle body of the motorcycle becomes larger than the preset threshold.

4. The torque control apparatus according to claim 2,
    wherein the detection unit detects that an actual acceleration of a wheel of the motorcycle becomes larger than a preset threshold and
    the output unit further reduces or keeps the request torque for the engine of the motorcycle and outputs the torque after the detection unit detects the state in which the front wheel of the motorcycle is likely to be lifted up and then detects that the actual acceleration of the wheel of the motorcycle becomes larger than the preset threshold.

5. The torque control apparatus according to claim 2,
    wherein the detection unit detects that an estimated acceleration of a wheel of the motorcycle becomes larger than a preset threshold and
    the output unit further reduces or keeps the request torque for the engine of the motorcycle and outputs the torque after the detection unit detects the state in which the front wheel of the motorcycle is likely to be lifted up and then detects that the estimated acceleration of the wheel of the motorcycle becomes larger than the preset threshold.

6. The torque control apparatus according to claim 1, wherein the accelerator operation information includes an accelerator position of the motorcycle and the detection unit detects the state in which the front wheel of the motorcycle is likely to be lifted up when a change rate or a change amount of the accelerator pedal position of the motorcycle becomes larger than a preset threshold.

7. The torque control apparatus according to claim 1, wherein the output unit corrects either or both of the request torque for the engine of the motorcycle and the brake torque based on bank information, pitch information, clutch information, estimated gear position information, or gear information of the motorcycle.

8. The torque control apparatus according to claim 1, wherein the engine information of the motorcycle includes the actual engine torque of the motorcycle and the change rate or the change amount of the actual engine torque and the detection unit detects the state in which the front wheel of the motorcycle is likely to be lifted up when the change rate or the change amount of the actual engine torque becomes larger than a threshold of the change rate or the change amount of the actual engine torque preset according to a magnitude of the actual engine torque or the actual engine torque becomes larger than a threshold of the actual engine torque preset according to a magnitude of the change rate or the change amount of the actual engine torque.

9. The torque control apparatus according to claim 8, wherein the threshold of the change rate or the change amount of the actual engine torque or the threshold of the actual engine torque is corrected based on the bank information, the pitch information, engine speed information, the accelerator operation information, the clutch information, the estimated gear position information, or the gear information of the motorcycle.

10. The torque control apparatus according to claim 1, wherein the detection unit detects the state in which the front wheel of the motorcycle is likely to be lifted up if at least one of conditions that the actual acceleration or the estimated acceleration of the vehicle body or the wheel of the motorcycle becomes larger than the preset threshold, that the actual engine torque becomes larger than the preset threshold, that the driver request torque for the motorcycle becomes larger than the preset threshold, that the accelerator pedal position becomes larger than the preset threshold, and that the engine speed becomes larger than the preset threshold is met.

11. The torque control apparatus according to claim 1, wherein, when a ratio between rotation speeds of a front wheel and a rear wheel of the motorcycle becomes larger than a preset threshold, the output unit outputs a torque smaller than the request torque of the driver as the request torque for the engine of the motorcycle.

* * * * *